June 30, 1964  J. W. POWELL  3,139,102
FLUID PRESSURE GOVERNOR
Filed July 1, 1960  3 Sheets-Sheet 1
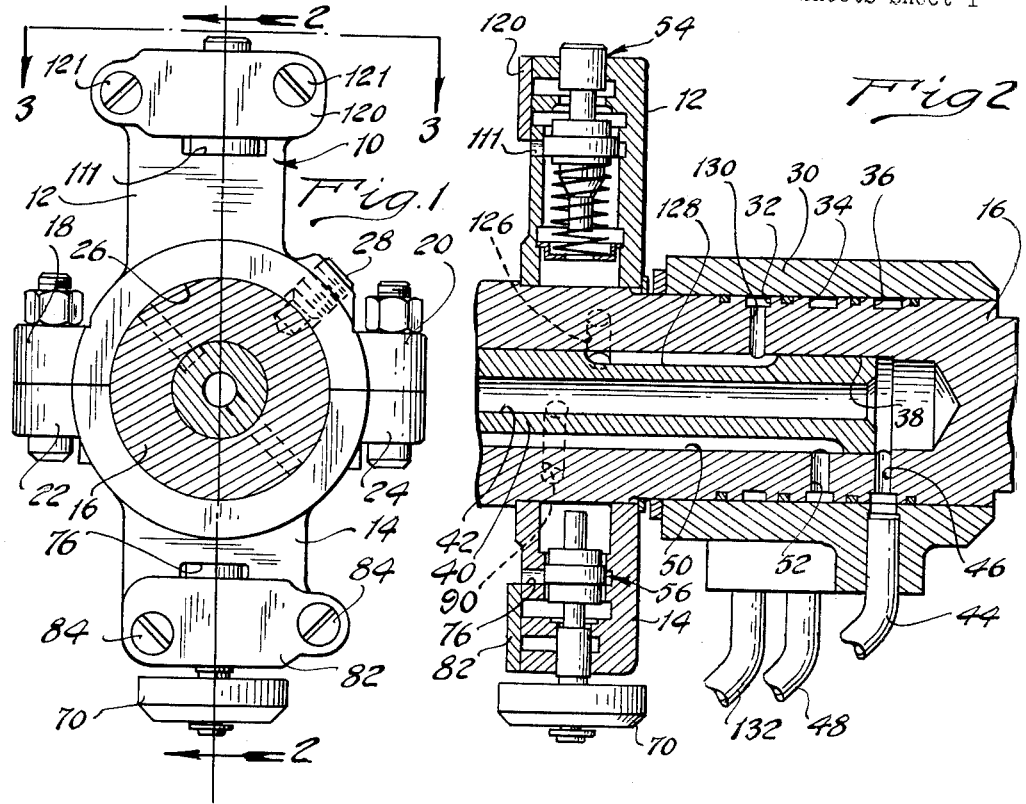
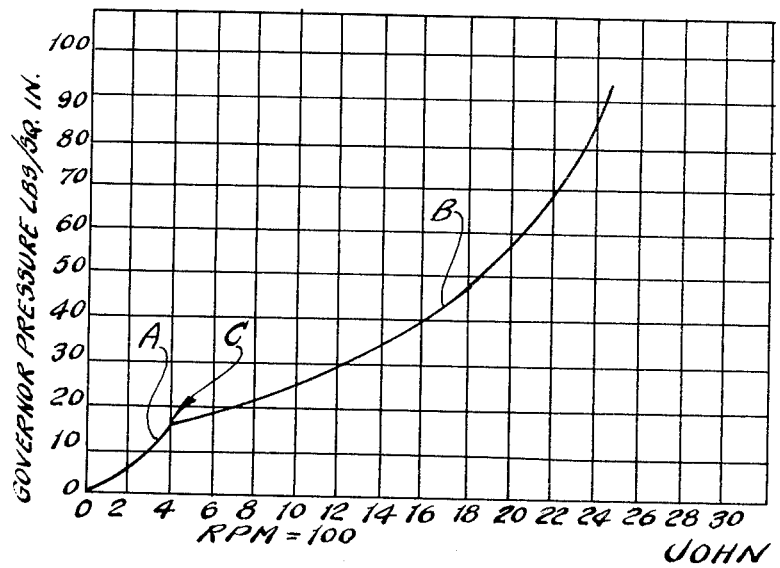
INVENTOR.
JOHN W. POWELL
BY
ATTORNEYS June 30, 1964  J. W. POWELL  3,139,102
FLUID PRESSURE GOVERNOR
Filed July 1, 1960  3 Sheets-Sheet 2
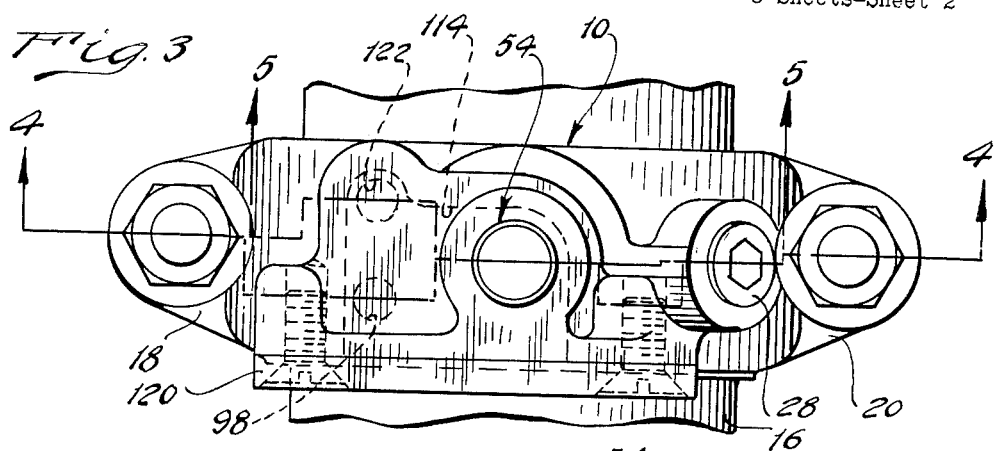
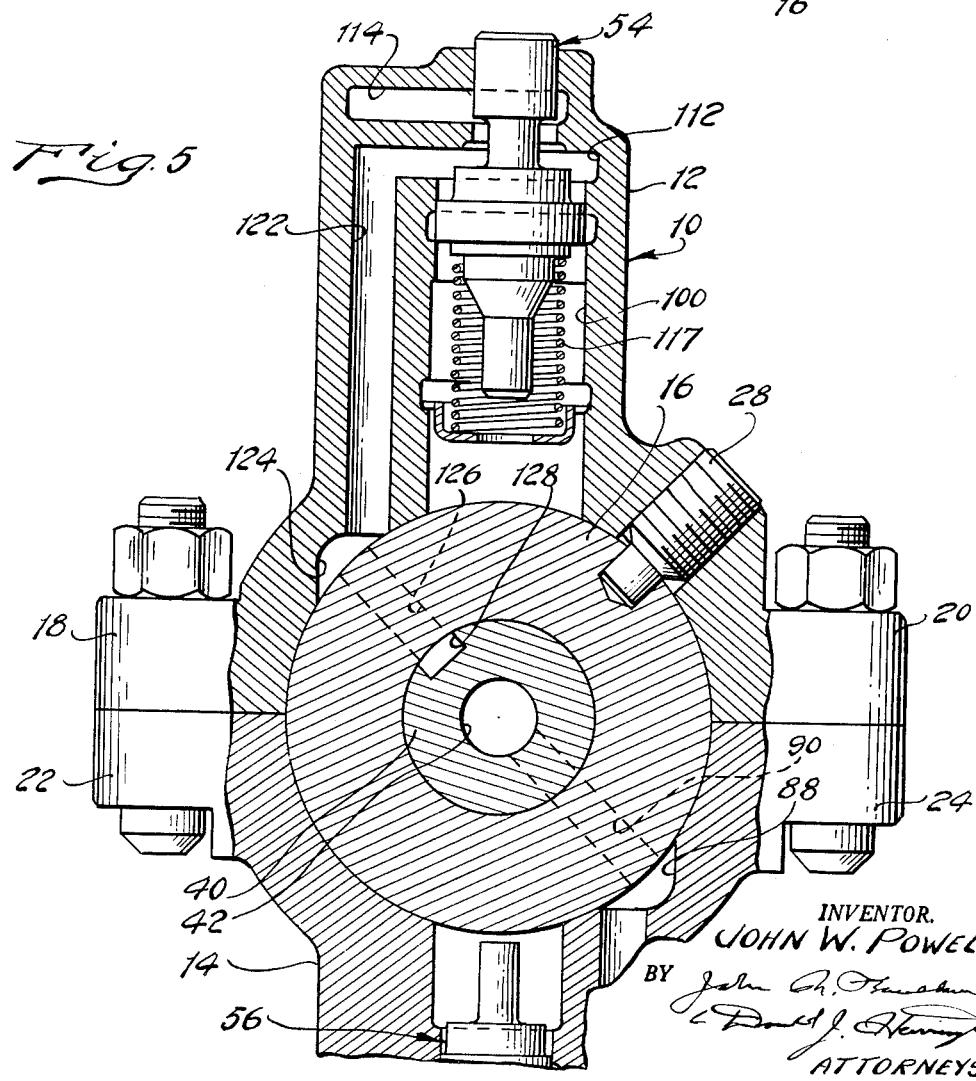
INVENTOR.
JOHN W. POWELL
BY
ATTORNEYS

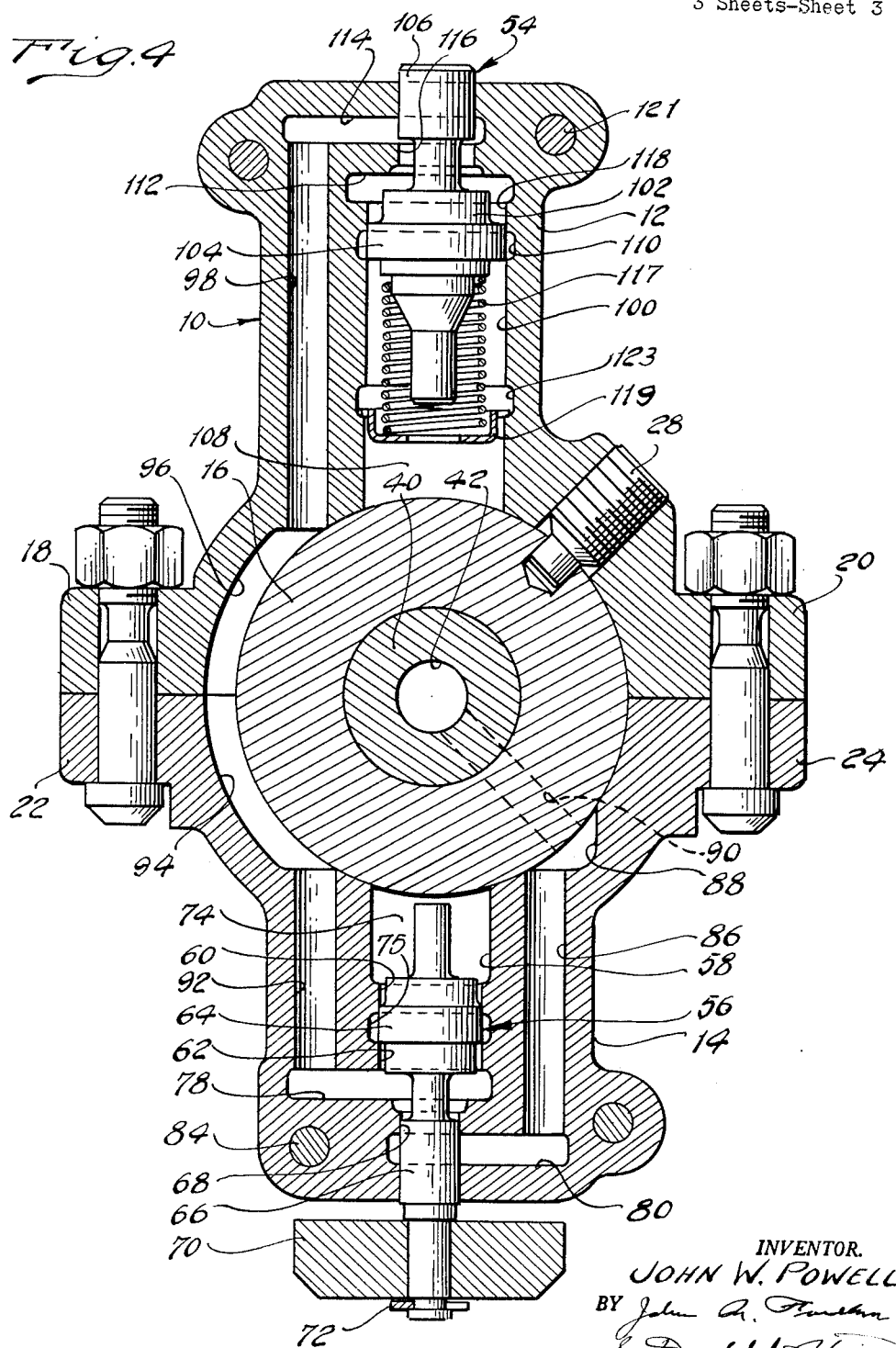

United States Patent Office 3,139,102
Patented June 30, 1964

3,139,102
FLUID PRESSURE GOVERNOR
John W. Powell, Garden City, Mich., assignor to Ford
 Motor Company, Dearborn, Mich., a corporation of
 Delaware
Filed July 1, 1960, Ser. No. 40,416
8 Claims. (Cl. 137—54)

My invention relates generally to speed sensing mechanisms, and more particularly to a fluid pressure governor capable of functioning as a rotary speed sensor.

My invention is particularly adapted to be used with automatic, multiple speed, power transmission mechanisms for initiating speed ratio shifts from one operating speed ratio to another. Such transmission mechanisms normally include an automatic control valve circuit comprising fluid pressure operated servos for energizing the transmission clutches or brakes. Suitable conduit structure connects the servos with a fluid pressure source, and this conduit structure is defined in part by fluid pressure distributor valves. This distributor valves are subjected to an input torque sensitive pressure signal and to a vehicle speed sensitive pressure signal so that the servos can be alternately pressurized and exhausted during a shift sequence. The relative speed ratios of the gear elements of the mechanism can be controlled in this fashion.

When the speed ratio shift pattern includes two or more shifts in the forward drive range, the optimum shift point during a transition from the lowest speed speed ratio to an intermediate speed ratio will be obtained when the govenor pressure signal varies rather sharply with vehicle speed. Conversely, the optimum shift point during a transition from the intermediate speed ratio to a still higher speed ratio will be obtained when the governor mechanism is less sensitive, so that the degree of variation in the speed signal for any given vehicle speed change is of a reduced magnitude.

These requirements make it necessary to use a two-stage fluid pressure governor that is more sensitive to speed changes during operation in the lower speed range than to speed changes during operation in the higher speed range. In certain governor mechanisms of known construction, a transition from one speed range to another is accomplished by providing a centrifugally responsive valve assembly with a compound, centrifugally operated mass. The transition from one operating range to another can be accomplished by altering the weight distribution of the centrifugally operated mass.

The valve assembly in such compound governor machanisms of known construction is subjected to opposed centrifugal and fluid pressure forces. The centrifugal forces increase when the speed of rotation of the governor mechanism increases, and this results in a higher opposed fluid pressure force. It is therefore possible in such a mechanism to alter the governing characteristics of the mechanism by effecting a change in the net fluid pressure area or reaction area. During operation in the lower speed range, a relatively large fluid pressure reaction area is used whereas a relatively reduced fluid pressure reaction area is used during operation in the high speed range.

The governor mechanism of my instant invention is capable of providing a two-stage pressure regulation as above described. This is accomplished, however, without altering the weight distribution or by altering the effective fluid pressure area acting on the valve assembly of the mechanism. The magnitudes of the opposed centrifugal and fluid pressure forces are therefore of an increased order in both operating stages, and this improves the reliability of the mechanism.

A principal feature of my invention resides in the provision of a high speed pressure regulating valve assembly and a separate low speed pressure regulating valve assembly, said valve assemblies being situated on opposed sides of the axis of rotation of the mechanism. During operation in the low speed range, the high speed valve assembly is moved to an inoperative position and the speed pressure signal is a result of the modulating action of the low speed valve assembly. When a transition is made from the low speed operating range to the high speed operating range, the output pressure from the low speed valve is again modulated by the high speed valve, and the fluid pressure signal is the result of the combined regulating action of the low speed valve and high speed valve. Because of this combined action, the mechanism is less sensitive to changes in speed when the mechanism is operating in the high speed range than it is when it is operating in the low speed range.

The provision of a compound governor of the type above described being a principal object of my invention, it is a further object of my invention to provide a governor mechanism with pressure modulating valve assemblies, the modulated pressure produced by one valve assembly being distributed to the second valve assembly, the latter modulating the pressure a second time to produce a speed signal that is proportional in magnitude to the speed of rotation of the mechanism.

It is a further object of my invention to provide a valve assembly as set forth in the preceding object wherein one of the valve assemblies is rendered inoperative during operation in the lower speed range, and wherein both of the valve assemblies produce a combined regulating characteristic during operation in the higher speed range.

It is a further object of my invention to provide a governor valve mechanism of the type above set forth wherein the individual valve assemblies comprise spool valve elements of simplified form and of relatively reduced radial dimensions.

It is a further object of my invention to provide a governor valve mechanism of the type above set forth wherein the valve assemblies are situated within a valve housing which may be secured in a simplified and permanent fashion to a rotary member.

Further objects and advantages of my invention will readily become apparent from the following description and from the accompanying drawings wherein.

FIGURE 1 is a plan view of my governor mechanism as viewed in the direction of the axis of the rotating member to which it is secured;

FIGURE 2 is a longitudinal cross-sectional view of the mechanism of FIGURE 1 and is taken along section line 2—2 of FIGURE 1;

FIGURE 3 is a top or plan view of the valve mechanism of FIGURE 1, and is viewed from the plane of section line 3—3 of FIGURE 1;

FIGURE 4 is a radial cross-sectional view of my governor mechanism, and is taken along section line 4—4 of FIGURE 3;

FIGURE 5 is another radial cross-sectional view of my governor valve mechanism, and is taken long section line 5—5 of FIGURE 3; and, FIGURE 6 is a graphical representation of the regulating characteristics of my improved governor mechanism.

Referring first to FIGURES 1, 2 and 3, numeral 10 designates generally a valve body which is in the form of a casting. Casting 10 comprises a pair of body portions 12 and 14 which are situated on opposed sides of a rotary shaft 16. In a power transmission mechanism, the shaft 16 comprises the power output shaft of the transmission.

The body portions 12 and 14 are formed with cooperating shoulders through which are positioned clamping bolts. The shoulders for body portion 12 are shown at 18 and 20, and the shoulders for body portion 14 are shown at 22 and 24.

The hub which is defined by the radially inward regions of body portions 12 and 14 is formed with a central bore 26 through which is received the shaft 16. The casting 10 is secured to shaft 16 by means of a set screw 28 theadably received in the hub of body portion 12.

Shaft 16 extends through a relatively stationary bushing 30, and it is formed with three axially spaced grooves 32, 34 and 36.

Shaft 16 is centrally bored as shown at 38, and it receives therein a fluid pressure distributor element 40. The element 40 is in turn formed with a central opening 42 which communicates with the right-hand end of opening 38, as viewed in FIGURE 2.

A pressure passage 44 is situated in bushing 30, and it communicates with groove 36. Opening 38 is in fluid communication with groove 36 through a radial passage 46.

Another passage 48 extends through bushing 30 and is in fluid communication with groove 34, the latter in turn being in fluid communication with an axial groove 50 through a radial passage 52. Both passages 44 and 48 accommodate line pressure which is supplied by a suitable fluid pressure source. Passage 48 is used to distribute fluid pressure through axial groove 50 to fluid pressure operated portions of a control circuit, not shown. Passage 44 is used to distribute control pressure to the valve assemblies for the governor mechanism which will be described hereinafter.

Referring next to FIGURES 3, 4 and 5, a high speed range valve assembly is generally shown at 54, and a low speed range valve assembly is generally shown at 56. The valve assemblies 54 and 56 are situated within radially extending valve openings or valve chambers formed in body portions 12 and 14, respectively. The valve chamber for valve assembly 56 is identified by reference character 58, and it is formed with internal valve lands 60 and 62.

The valve assembly 56 includes a large diameter valve land 64 and a relatively small diameter valve land 66, the latter cooperating with a relatively small internal valve land 68 at the radially outward region of the valve chamber 58. Valve land 66 extends outwardly from the body portion 14, and it carries an extension on which is secured a centrifugal weight 70. The weight 70 is held in place on the extension for valve land 66 by a snap ring 72, the weight 70 thereby being held in engagement with a cooperating shoulder on the valve land extension.

The radially inward region of the chamber 58 defines an exhaust chamber which is identified by reference character 74. An exhaust groove 75 is located radially outward from chamber 74, and it communicates with the exterior of the valve mechanism through a port 76 formed in the body portion 14, as indicated in FIGURE 1.

A fluid pressure distributing groove 78 is formed in body portion 14, and it communicates with a relatively large diameter portion of chamber 58. In a similar fashion a fluid pressure distributing groove 80 is formed in body portion 14 in spaced relationship with respect to groove 78, and it communicates with the relatively small diameter portion of chamber 58.

If desired, the grooves 78 and 80 can be formed by coring during the casting process. The external surface of the body portion 14 can then be machined and the grooves 78 and 80 can then be covered by a suitable closure plate, which is shown in FIGURES 1 and 2 at 82. The plate 82 can be secured to body portion 14 by screws 84.

Groove 80 communicates with a radially extending passage 86 which communicates with an inwardly situated recess 88 formed in the hub of body portion 14. Recess 88 in turn communicates with passage 42 of the distributor element 40 through a passage 90, the latter being defined by communicating passage parts formed in shaft 16 and in distributor element 40. Line pressure is thereby distributed from line pressure passage 44 to the groove 80 through the communicating passage structure thus described.

Groove 78 communicates with a radially extending passage 92 formed in body portion 14, and the radially inward region of passage 92 communicates with an arcuate recess 94 that partially extends around shaft 16. Recess 94 communicates with a corresponding recess 96 in the juxtaposed body portion 12 of casting 10. Recess 96 extends to a radically extending passage 98 formed in body portion 12.

The valve assembly 54 includes a valve spool that is slidably positioned in a valve chamber 100 formed in body portion 12. This valve spool, which is identified by reference character 102, includes a relatively large diameter valve land 104 and a relatively small diameter valve land 106. The radially inward region of chamber 100 defines an exhaust chamber, and is identified by reference character 108. Chamber 100 is also formed with an internal groove 110 which communicates with an exhaust opening 111 formed in the body portion 12 to provide communication with the exterior of the valve mechanism.

Body portion 12 is formed with a groove 112 that communicates with the relatively large diameter portion of chamber 100, and with a groove 114 which communicates with the relatively small diameter portion of chamber 100.

Valve land 106 cooperates with a relatively small diameter internal valve land 116. Valve land 104 cooperates with a relatively large diameter internal valve land 118.

The grooves 114 and 112 can be formed during the casting operation by suitable coring. The exterior of the body portion 12 can then be finished machined, and the grooves 112 and 114 can be covered by a cover plate 120. Suitable screws 121 can be provided for fastening the plate 120 to the body portion 12.

The high speed valve assembly or valve spool is normally biased in a radially outward direction by a compression spring 117 that is seated on a suitable spring seat 119. The periphery of spring seat 119 is engaged with a spring seat retainer groove 123 formed in the interior of chamber 100. Seat 119 is centrally apertured to provide free communication between the region occupied by spring 117 and the radially inward portion of the exhaust chamber 108.

As best seen in FIGURE 5, groove 112 is in fluid communication with another radially extending passage in body portion 12, as shown at 122. The radially inward extremity of passage 122 communicates with a recess 124 formed in body portion 14. This recess 124 is in turn in fluid communication with a radially extending passage 126 formed in shaft 16.

The distributor element 40 is formed with an axially extending groove 128 that is shown in FIGURES 2 and 5, said groove 128 communicating with a radial passage 130 extending to groove 32, the passage 130 and groove 32 being formed in shaft 16 as indicated in FIGURE 2.

A governor pressure passage 132 is formed in boss 30, and it is in fluid communication with groove 32. Passage 132 in turn extends to speed sensitive portions of the control circuit with which the governor mechanism of my instant invention is used.

During operation of the governor mechanism aforedescribed, fluid pressure will be supplied continuously to the low speed valve assembly, thereby pressurizing continuously groove 80. When the shaft 16 starts from rest, the spring 117 on the high speed valve assembly urges the high speed valve spool in a radially outward direction so that it engages the side of internal annular groove 116.

Under initial starting conditions, the low speed valve assembly will function to modulate the line pressure made available to annular groove 80. The combined centrifugal mass of the weight 70 and the valve itself will establish outwardly directed centrifugal forces which are opposed and balanced by the fluid pressure force created by the pressure in groove 78 acting on the differential area of valve lands 64 and 66. When the low speed valve assembly is moved radially outward, the degree of communication between line pressure groove 80 and pressure groove 78 is increased, and the degree of communication between the exhaust groove and pressure groove 78 is decreased. This results in a pressure build-up in groove 78, and this pressure build-up is an indicator of the speed of rotation of shaft 16.

The modulated pressure in groove 78 is distributed through passage 92, recess 94, recess 96 and passage 98 to groove 114 in the body portion 12. This pressure acts on the differential area of valve lands 106 and 104 on the high speed valve spool. The high speed valve spool is also subjected to centrifugal forces which oppose and balance the fluid pressure force created by the pressure in groove 112 during operation in the high speed range. It is therefore apparent that the high speed valve assembly will modulate the pressure made available to groove 114 after a predetermined speed is reached.

Upon an increase in the speed of rotation in shaft 16, the centrifugal force acting on the high speed valve spool will cause the latter to move in a radially outward direction, thereby increasing the degree of communication between grooves 112 and 114 while simultaneously decreasing the degree of communication between groove 112 and exhaust groove 110. This results in an increase of the pressure made available to annular groove 112.

The pressure in groove 112 is distributed through passage 122, passage 126, groove 128, passage 130 and groove 32 to the governor pressure passage 132, previously described.

During operation in the low speed range, the high speed valve spool is urged in a radially outward direction by valve spring 117 to an inoperative position. Free communication is thus established during operation in the low speed range between grooves 112 and 114. The high speed valve assembly thereby has no influence on the magnitude of the pressure signal that is made available to groove 112.

After a predetermined speed of rotation is obtained, the pressure in passage 112 is sufficient to overcome the opposing influence of spring 117 and the centrifugal force acting on the high speed valve spool. The high speed valve spool will therefore assume a pressure regulating position. Upon any subsequent increase in the speed of rotation of shaft 16, the high speed valve spool will begin to modulate the pressure in passage 98 and groove 114 to produce an output pressure signal in groove 112.

The resultant fluid pressure signal that is made available during operation in the high speed range is thus the result of the combined influence of the regulating characteristics of the high speed valve and the low speed valve. It is because of this double modulating action of each of the valves that the sensitivity of the governor mechanism during operation at high speeds is relatively reduced. That is, the change in the governor pressure made available to passage 132 for any given speed change is of a relatively reduced order of magnitude when compared to the change in the pressure signal that is made available for a corresponding speed change during operation at lower speeds.

Referring next to FIGURE 6, the transition from the low speed range to the high speed range is readily apparent. The variation of governor pressure with speed during the first stage of operation is indicated by the curve A, and the corresponding curve for the second stage is shown at B. The slope at any point on curve A is substantially greater than the slope at corresponding points on curve B. This indicates that the sensitivity of the governor mechanism is of a reduced order of magnitude when operating at higher speeds. The transition from curve A to curve B is characterized by a breakpoint C. It is at this point that the high speed valve assembly begins to modulate the pressure that is made available to groove 112 by the low speed valve assembly.

The radial dimensions of the valve spools for the high speed and low speed valve assemblies are of a relatively reduced order of magnitude since only two regulating valve lands are required. The relative simplicity of the valve elements, together with the simple design of the valve bodies themselves, contributes to economy in manufacture without any corresponding sacrifice in quality or performance. The opposed fluid pressure and centrifugal forces acting on the valve spools are of a high order of magnitude, and this increases the reliability of the governor mechanism.

Having thus described a preferred embodiment of my invention, what I claim and desire to secure by United States Letters Patent is:

1. In a fluid pressure governor adapted to provide a pressure signal that is proportional in magnitude to the speed of rotation of a rotary member, a valve body carried by said rotary member, a pair of valve assemblies in said valve body, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve assembly being adapted to modulate said control pressure to produce a resulting pressure that is functionally related in magnitude to the speed of rotation of said rotary member, means for distributing said resulting pressure to said other valve assembly, the valve element for said other valve assembly being adapted to modulate said resulting pressure to produce said pressure signal during operation at speeds of rotation greater than a predetermined value, and means for rendering said other valve assembly inoperative during operation at speeds of rotation less than said predetermined value, said pressure distributing means communicating directly with said second passage structure when said other valve assembly assumes an inoperative position.

2. In a fluid pressure governor adapted to provide a pressure signal that is proportional in magnitude to the speed of rotation of a rotary member, a valve body carried by said rotary member, a pair of valve chambers formed in said valve body on diametrically opposed sides of said rotary member, a valve assembly situated in each valve chamber, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve assembly being adapted to modulate said control pressure to produce a resulting pressure that is functionally related in magnitude to the speed of rotation of said rotary member, said resulting pressure acting on the valve element for said one valve assembly to produce a fluid pressure force that opposes a centrifugal force acting thereon, means for distributing said resulting pressure to said other valve assembly, the valve element for said other valve assembly being adapted to modulate said resulting pressure to produce said pressure signal during operation at speeds of rotation greater than a predetermined value, said pressure signal acting on the valve element for said other valve assembly to urge the same in a radially inward direction against the opposing influence of the centrifugal force acting thereon, and means for rendering said other valve assembly inoperative during operation at speeds of rotation less than said predetermined value, said pressure distributing means freely communicating with said second passage structure when said other valve assembly assumes an inoperative position.

3. In a fluid pressure governor adapted to provide a pressure signal that is proportional in magnitude to the speed of rotation of a rotary member, a valve body carried by said rotary member, a pair of valve assemblies in said valve body, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve assembly being adapted to modulate said control pressure to produce a resulting pressure that is functionally related in magnitude to the speed of rotation of said rotary member, means for distributing said resulting pressure to said other valve assembly, the valve element for said other valve assembly being adapted to modulate said resulting pressure to produce said pressure signal during operation at speeds of rotation greater than a predetermined value, means for rendering said other valve assembly inoperative during operation at speeds of rotation less than said predetermined value, the valve element for said other valve assembly being adapted to provide free communication between said second passage structure and said pressure distributing means when it assumes a radially outward position and to inhibit such communication when it assumes a radially inward position, and spring means acting on said valve element for said other valve assembly to urge the same in a radially outward direction to supplement the centrifugal force acting thereon.

4. In a fluid pressure governor adapted to provide a pressure signal that is proportional in magnitude to the speed of rotation of a rotary member, a valve body carried by said rotary member, a pair of valve chambers formed in said valve body on diametrically opposed sides of said rotary member, a valve assembly situated in each valve chamber, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve asembly being adapted to modulate said control pressure to produce a resulting pressure that is functionally related in magnitude to the speed of rotation of said rotary member, said resulting pressure acting on the valve element for said one valve assembly to produce a fluid pressure force that opposes a centrifugal force acting thereon, means for distributing said resulting pressure to said other valve assembly, the valve element for said other valve assembly being adapted to modulate said resulting pressure to produce said pressure signal during operation at speeds of rotation greater than a predetermined value, said pressure signal acting on the valve element for said other valve assembly to urge the same in a radially inward direction against the opposing influence of the centrifugal force acting thereon, means for rendering said other valve assembly inoperative during operation at speeds of rotation less than said predetermined value, said pressure distributing means freely communicating with said second passage structure when said other valve assembly assumes an inoperative positon, the valve element for said other valve assembly being adapted to provide free communication between said second passage structure and said pressure distributing means when it assumes a radially outward position and to inhibit such communication when it assumes a radially inward position, and spring means acting on said valve element for said other valve assembly to urge the same in a radially outward direction to supplement the centrifugal force acting thereon.

5. In a fluid pressure governor adapted to provide a pressure signal that is proportional in magnitude to the speed of rotation of a rotary member, a valve body carried by said rotary member, a pair of valve assemblies in said valve body, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve assembly being adapted to modulate said control pressure to produce a resulting pressure that is functionally related in magnitude to the speed of rotation of said rotary member, means for distributing said resulting pressure to said other valve assembly, the valve element for said other valve assembly being adapted to modulate said resulting pressure to produce said pressure signal during operation at speeds of rotation greater than a predetermined value, means for rendering said other valve assembly inoperative during operation at speeds of rotation less than said predetermined value, said pressure distributing means communicating directly with said second passage structure when said other valve assembly assumes on inoperative position, the valve element for said other valve assembly being adapted to provide free communication between said second passage structure and said pressure distributing means when it assumes a radially outward position and to inhibit such communication when it assumes a radially inward position, and spring means acting on sad valve element for said other valve assembly to urge the same in a radially outward direction to supplement the centrifugal force acting thereon.

6. In a fluid pressure governor adapted to provide a pressure signal that is proportional in magnitude to the speed of rotation of a rotary member, a valve body carried by said rotary member, said valve body being formed in two parts, said body parts being disposed on diametrically opposed sides of said rotary member, means for detachably securing together the radially inward region of said body parts about said rotary member, a radially disposed valve chamber formed in each valve body part, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve assembly being adapted to modulate control pressure to produce a resulting pressure that is functionally related in magnitude to the speed of the rotation of said rotary member, said resulting pressure acting on said valve element for said one valve assembly to urge the same in a radially inward direction against the opposing influence of centrifugal force, means for distributing said resulting pressure to said other valve assembly, the valve element for said other valve assembly being adapted to modulate said resulting pressure to produce said pressure signal during operation at speeds of rotation greater than a predetermined value, said pressure signal acting on said valve element for said other valve assembly to urge the same in a radially inward direction against the opposing influence of said centrifugal force, and means for rendering said other valve assembly inoperative during operation at speeds of rotation less than said predetermined value whereby the magnitude of said pressure signal is less sensitive to changes in the speed of rotation of said rotary member during operation at relatively low speeds than to corresponding speed changes during operation at higher speeds.

7. In a fluid pressure governor adapted to provide a pressure signal that is proportional in magnitude to the speed of rotation of a rotary member, a valve body carried by said rotary member, said valve body being formed in two parts, said body parts being disposed on diametrically opposed sides of said rotary member, means for detachably securing together the radially inward region of said body parts about said rotary member, a radially disposed valve chamber formed in each valve body part, first passage structure communicating with one valve assembly for distributing control pressure thereto, second passage structure communicating with the other valve assembly for conducting said pressure signal therefrom, each of said valve assemblies including a movable, centrifugally responsive valve element, the valve element for said one valve assembly being adapted to modulate control pressure to produce a resulting pressure that is functionally related in magnitude to the speed of rotation of said rotary member, said resulting pressure acting on said valve element for said one valve assembly to urge the same in a radially inward direction against the opposing influence of centrifugal force, means for distributing said resulting pressure to said other valve assembly, the valve element for said other valve assembly being adapted to modulate said resulting pressure to produce said pressure signal during operation at speeds greater than a predetermined value, said pressure signal acting on said valve element for said other valve assembly to urge the same in a radially inward direction against the opposing influence of said centrifugal force, the valve element for said other valve assembly being adapted to provide free communication between said second passage structure and said pressure distributing means during operation at speeds of rotation less than said predetermined value when it assumes a radially outward position and to restrict such communication when it assumes a radially inward position, and spring means acting on said valve element for said other valve assembly to urge the same in a radially outward direction to supplement the centrifugal force acting thereon.

8. In a fluid pressure governor adapted to provide a pressure signal that is proportional in magnitude to the speed of rotation of a rotary member, a valve body carried by said rotary member, a pair of pressure modulating valve means in said valve body, passage structure for distributing control pressure from a fluid pressure source to the first of said valve means, said first valve means being adapted to modulate said control pressure to produce a resulting pressure that is functionally related in magnitude to the speed of rotation of said rotary member, internal passage structure interconnecting each of said valve means, the second valve means being adapted to modulate said resulting pressure during operation at speeds of rotation greater than a predetermined value to produce a fluid pressure speed signal that is less sensitive to changes in the speed of rotation of said rotary member than the corresponding sensitivity of said resulting pressure, and means for inhibiting the modulating action of said second valve means during operation of said rotary member at speeds less than said predetermined value.

References Cited in the file of this patent
UNITED STATES PATENTS

| | | |
|---|---|---|
| 2,889,844 | McFarland | June 9, 1959 |
| 3,032,049 | Schulz | May 1, 1962 |
| 3,043,322 | Schulz | July 10, 1962 |
| 3,048,184 | Duffy | Aug. 7, 1962 |
| 3,049,028 | English | Aug. 14, 1962 |